Aug. 15, 1939.     W. B. WAIT     2,169,401
LOCK FOR LOCOMOTIVE VALVE GEARS
Filed May 14, 1935     2 Sheets-Sheet 2
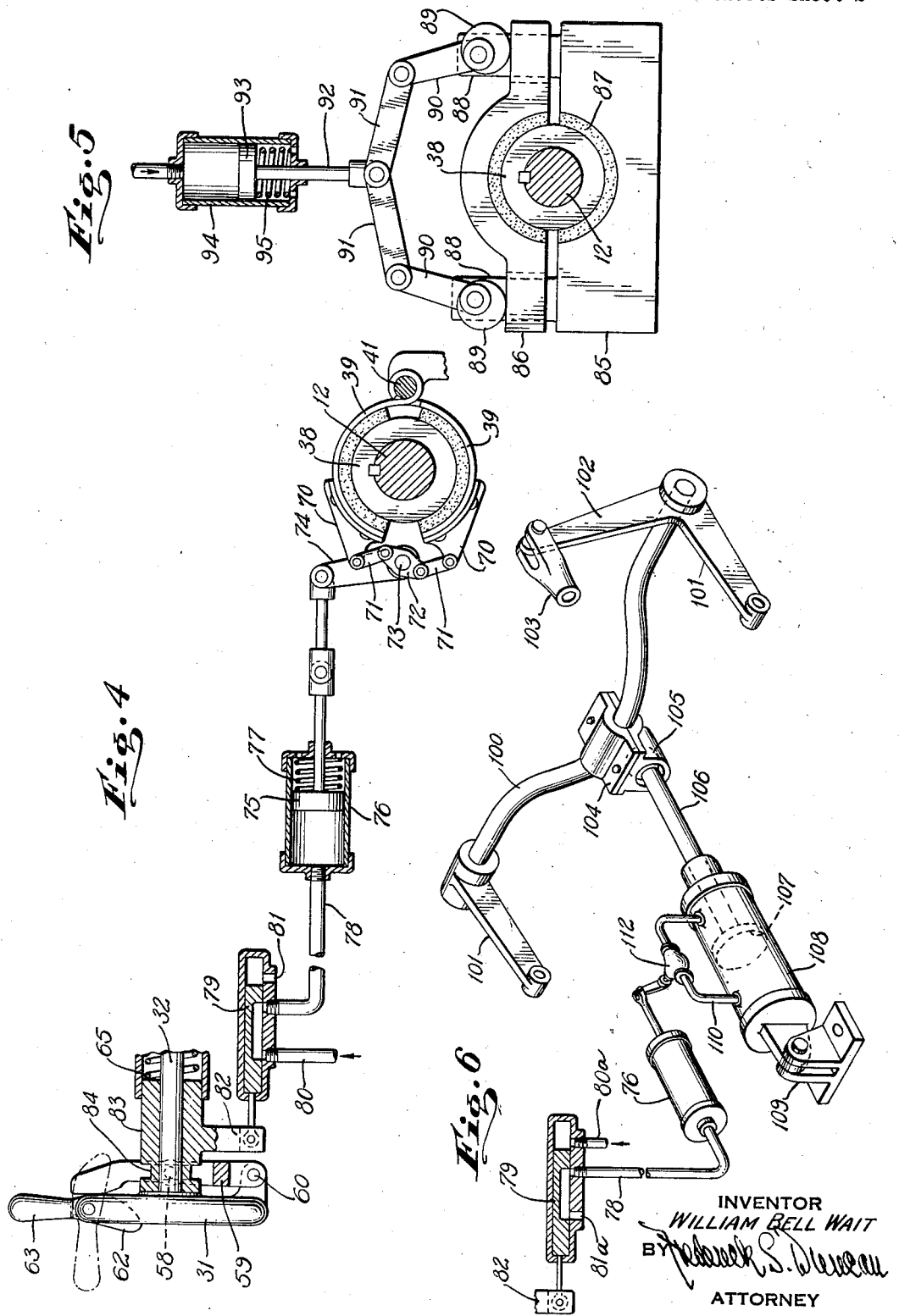
INVENTOR
WILLIAM BELL WAIT
BY
ATTORNEY Patented Aug. 15, 1939

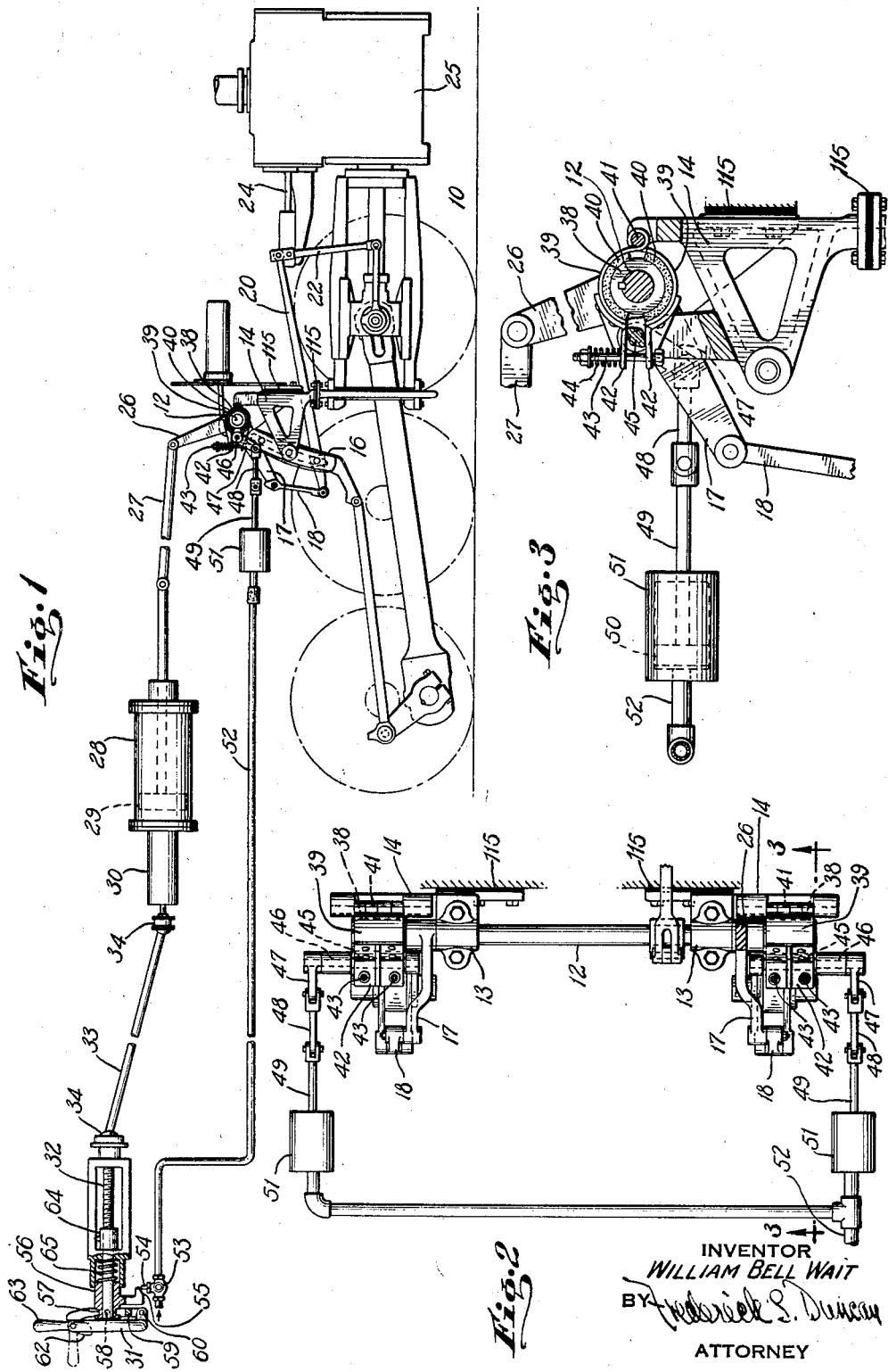

2,169,401

UNITED STATES PATENT OFFICE 2,169,401

LOCK FOR LOCOMOTIVE VALVE GEARS

William Bell Wait, New York, N. Y.

Application May 14, 1935, Serial No. 21,407

13 Claims. (Cl. 121—162)

The present invention relates to locomotive valve gear and has for an object to provide automatic means for locking the gear at any position in which it may be placed by the reversing gear, thereby preventing the point of cut-off from being changed by valve impacts.

The valve gear of a reciprocating steam locomotive is controlled by the angular position of a reverse or tumbling shaft and this shaft is adjusted angularly by operation of a reverse lever or by reverse mechanism operated by screw or power reverse gears. It is well-known that in the operation of a locomotive great stresses may be developed in the operation of the valves which stresses are transmitted through the valve gear to the tumbling shaft and thence to the hand lever or reverse gear which controls the angular position of said shaft. In fact the development of screw and power reverse gears was due to such stresses, for as the size and power of locomotives was increased it became impracticable to control the position of the tumbling shaft by means of the ordinary hand lever. When the latch on the reverse lever was released to permit of moving the lever it sometimes happened when at speed that the valve stresses would throw the lever "into the corner", that is, into the position for long cut off. Matters came to such a pass that on powerful locomotives equipped with hand operated reverse levers the engine-man would not change the point of cut-off, although such change might be most necessary from the point of view of economy or of developing power. With the development of power reverse gears of screw type and of fluid pressure type the engineer could change the cut-off setting at will, regardless of the speed at which the locomotive was running. However, the stresses communicated to the reverse gear through the tumbling shaft must be absorbed in said gear and its connections and they create unnecessary wear and tear both in the reverse gear and in the connections, with consequent increase in maintenance costs. In large locomotives these stresses have been known to be so violent as to tear the reverse gear from the locomotive, causing engine failure and risk of damage and injury.

I am aware that snubbers have been employed to take up and absorb such stresses by imposing friction on moving parts. As a result of such friction they tend to wear out and give non-uniform service from hour to hour and day to day. A further disadvantage of the use of snubbers is that they offer resistance to angular movement of the tumbling shaft, which resistance must be overcome by the reverse gear. This means that additional power over that normally required must be applied to change the cut-off. Another disadvantage of the use of snubbers which merely retard movement frictionally is that they do not entirely prevent movement or creeping under violent impacts with the consequent change of the point of cut-off.

It is an object of the present invention to overcome the difficulties enumerated above by providing means which instead of merely retarding movement of the tumbling shaft will actually lock said shaft against movement except while it is being adjusted by the reverse gear.

Another object of the invention is to provide a positive lock for the tumbling shaft. It is well-known that the crank pins on one side of the locomotive are disposed 90 degrees in advance or behind the crank pins on the other side. Consequently, the tumbling shaft is subjected to torsional stresses since one end of the shaft will receive an impact 90 degrees ahead of the other. This may result in distortion and in a difference in point of cut-off between the valves on opposite sides of the locomotive. It will also be apparent that the end of the shaft on which is located the arm that is operated and hence supported by the power reverse gear will be more rigidly held than the other end which is not so supported, and hence under certain powerful stresses the cut-off on one side of the locomotive during such periods of distortion may be shorter or longer as the case may be than the cut-off on the other side of the locomotive. To overcome this difficulty it is an object of the present invention to provide a brake on each end of the tumbling shaft, such brakes being normally applied to the shaft and being powerful enough to lock the shaft against turning under valve impact. The brakes being applied to each end of the shaft prevent distortion.

It is a further object of my invention to provide means for automatically releasing such tumbling shaft brakes upon operating the reversing gear and reapplying said brakes when such operation is completed.

While in the preferred embodiment of my invention I employ a brake at each end of the tumbling shaft it is also within the purview of my invention to apply a single brake or locking means acting on the tumbling shaft at a point intermediate its ends, thereby simplifying the mechanism and at the same time reducing the amount of shaft distortion possible to within practical limits.

In addition to rigidly locking the tumbling shaft it is also within the purview of my invention to provide resilient means to assist in absorbing the valve shocks, such resilient means being provided either between the tumbling shaft and the valves or in the tumbling shaft or its mounting or connections, so that the entire shock does not have to be absorbed by the linkage between the valve and the tumbling shaft but may in part at least be absorbed by such resilient means.

Other objects and advantages of my invention will appear in the following description of a preferred embodiment and certain modifications thereof and thereafter the novelty and scope of the invention will be pointed out in the claims.

In the accompanying drawings;

Figure 1 is a view in side elevation of a typical locomotive valve gear with my improved braking mechanism applied to the tumbling shaft;

Fig. 2 is a plan view of the tumbling shaft, brakes and associated elements;

Fig. 3 is a view in section taken on the line 3—3 of Fig. 2;

Fig. 4 is a fragmentary view in longitudinal section of a tumbling shaft and a brake control therefor in which the brake is normally applied by power which is released upon operation of the valve gear;

Fig. 5 is a view in transverse section of another form of brake mechanism; and,

Fig. 6 is a fragmentary view in perspective showing a central hydraulic brake or lock for a tumbling shaft.

Referring to the embodiment of my invention illustrated in Figs. 1 to 3 inclusive, I show a portion of a locomotive 10 equipped with a valve gear of a standard type. This gear comprises a tumbling shaft 12 mounted in bearings 13 which are supported on brackets 14 bolted to the locomotive frame. Each bracket 14 provides a fulcrum for an oscillating link 16. Crank arms 17 fixed upon the tumbling shaft 12 adjacent opposite ends thereof are connected by hangers 18 to radius rods 20 which carry the usual link blocks adapted to slide in the links 16. The radius rods 20 are connected through lap lead levers 22 to the stems 24 of the valves which control admission and exhaust of steam to the main cylinders 25. To control the angular position of the tumbling shaft 12 the latter is provided near one end with a crank arm 26 which is connected through a reach rod 27 to the reverse gear 28. The latter consists of a cylinder in which slides a plunger 29 connected to the reach rod. The plunger is maintained at adjusted position therein by fluid pressure on opposite sides thereof. By means indicated at 30 the position of the plunger and the supply of fluid to opposite sides thereof may be adjusted. The control means 30 is in turn controlled by manual means within the locomotive cab. The latter means comprise a hand wheel 31 fixed upon a screw shaft 32 which, through a connecting shaft 33 and a pair of universal joints 34, enables the engineer to operate the control means 30 and thereby adjust the position of the tumbling shaft 12. The mechanism so far described is known in the art and no claim is made to the mechanism per se.

Fixed upon each end of the tumbling shaft 12 is a brake drum 38 and each drum is normally engaged by a pair of brake shoes 39 lined with suitable braking fabric 40. Each pair of brake shoes is hinged at one end upon a common hinge pin 41 carried by the bracket 14. The shoes have, at their opposite ends, extensions 42 through which pass bolts 43. Springs 44 on the bolts 43 serve to clamp the shoes upon the drums 38 so tightly as to overcome any tendency for the shaft 12 to move angularly under valve impact. Mounted between the extensions 42 of each pair of brake shoes is a cam 45 fixed upon a shaft 46. Each shaft 46 is mounted in an extension of the adjacent bracket 14 and has a crank arm 47 fixed thereon. Each arm is connected by a link 48 to the piston rod 49 of a plunger 50 which is fitted to slide in a cylinder 51. A pipe 52 supplies fluid under pressure to both of the cylinders 51 to move the plungers 50 toward the right, as viewed in Fig. 3, thereby spreading the brake shoes apart and releasing their hold on the drums 38 of the tumbling shaft 12. The fluid used to operate the plungers 50 may be steam or air and the supply of fluid to the pipe 52 is controlled by a valve 53 which is normally spring-pressed to closed position. The valve 53 is of a type which will vent the pipe 52 to atmosphere when the valve is closed but will close such vent when the valve is opened to admit fluid to the cylinders 51.

The valve 53 has an operating stem 54 which is depressed to open the valve by a cam finger 55 projecting from a sleeve 56 which is mounted to slide upon the screw shaft 32. This sleeve is formed with an annular groove 57 adapted to be engaged by diametrically opposed pins 58 of a yoke 59 (see also Fig. 4). This yoke is pivoted at 60 to the control wheel 31 and the opposite end of the yoke is adapted to be engaged by a cam 62. The latter is pivoted upon the wheel 31 and is formed with a handle extension 63. Normally, the handle occupies the position shown in full lines in Fig. 1 and the valve 53 is closed to the fluid supply but opens the pipe 52 to atmosphere.

In operation, whenever it is desired to change the cut-off point of the valve gear the operator pulls the handle 63 to the position shown in broken lines in Fig. 1 and uses the handle 63 to rotate the wheel 31, thereby advancing or retarding the cut-off setting to the extent desired, as indicated by a pointer 64 fed along the screw 32. As soon as the operator pulls the handle 63 to the dotted line position the yoke 59 is swung toward the right, as viewed in Fig. 1, sliding the sleeve 56 in the same direction and thereby causing the cam finger 55 to depress the valve stem 54. This results in the admission of fluid under pressure to each of the cylinders 51 forcing the plungers 50 toward the right, as viewed in Fig. 3, and, thereby turning the cam 45 to spread the brake shoes and release the tumbling shaft while it is being adjusted to the desired angular position by turning the wheel 31. After the desired adjustment has been made the operator merely swings the handle 63 to the position shown in Fig. 1 and a spring 65 acting on the sleeve 56 restores the latter to normal position, permitting valve 53 to cut off the fluid pressure and connect the two cylinders 51 to atmosphere. Immediately the springs 44 cause the brake shoes to clamp each end of the tumbling shaft so as to prevent the latter from turning and so as to hold the shaft in the set angular position.

In Fig. 4 I show another form of brake mechanism in which, instead of depending upon springs to apply the brakes to the tumbling shaft, fluid pressure is employed for this purpose. However, in this case as in that already described it is intended that the pressure of the brakes upon the tumbling shaft will be such as to prevent the shaft from turning under valve stresses to which it may be subjected. The parts in Fig. 4 which correspond to those in Figs. 1 to 3 inclusive are given the same reference numerals. The brake shoes shown in Fig. 4 have extensions 70 which differ from the extensions 42, shown in Fig. 3. The extensions 70 of each pair of brake shoes are connected by links 71 to a cross-arm 72 fixed upon a shaft 73. Each shaft 73 is provided with a crank-arm 74 which is connected to a plunger 75 operating in a cylinder 76. A spring 77 in each cylinder urges the plunger 75 toward the left, as viewed in Fig. 4, but normally the plunger is maintained in the position illustrated by fluid under pressure admitted through a pipe 78. In this position the cross-arms 72 and links 71 draw the brake shoes together to clamp the drum 38 against movement.

The single pipe 78 serves both of the cylinders 76 so that the brakes are applied simultaneously at both ends of the tumbling shaft. The admission of operating fluid is controlled by a slide valve 79 which in normal position connects the pipe 78 to a supply pipe 80. When the slide valve 79 is moved toward the right, as viewed in Fig. 4, it connects the pipe 78 to a vent 81 leading to atmosphere. The slide valve 79 is connected to an arm 82 depending from a sleeve 83 which is mounted to slide on the screw shaft 32. The sleeve 83 has an annular groove 84 which is engaged by the pins 58 of the yoke 59. As in the construction shown in Fig. 1 the yoke 59 may be swung toward the right by swinging the handle 63 to the dotted line position, thereby connecting the cylinders 76 to atmosphere and permitting the springs 77 to spread the pairs of brake shoes and release the tumbling shaft 12.

In the construction shown in Fig. 5 a similar control is provided for connecting an operating cylinder to atmosphere whenever it is desired to adjust the position of the tumbling shaft, thereby releasing the brakes which are normally held by fluid pressure in clamping engagement with the tumbling shaft. The brakes employed in the structure illustrated fragmentally in Fig. 5 differ somewhat from those already described. Each brake drum 38 is arranged to turn between two brake members 85 and 86 respectively, each of which is fitted with suitable brake lining 87. The member 86 is formed with forks at opposite ends thereof to embrace two pins 88 which project from the member 85. Mounted on each pin 88 is an eccentric 89 adapted to bear on the member 86 and force the latter toward the member 85, thereby applying a braking pressure upon the drum 38. To turn the eccentrics 89, I provide a pair of crank-arms 90 which are connected by links 91 to the stem 92 of a plunger 93 fitted to slide in the cylinder 94. A spring 95 acting on the plunger 93 tends to move the latter upwardly, as viewed in Fig. 5, thereby turning the eccentrics 89 in such direction as to relieve the braking action on the drum 38. However, when fluid under pressure is admitted into the cylinder 94, eccentrics 89 will be turned in the opposite direction causing the members 85 and 86 to grip the drum 38 and prevent the tumbling shaft 12 from rotating. It will be understood that this brake mechanism may be provided at each end of the tumbling shaft and the supply of fluid under pressure to cylinders 94 may be controlled in the same way as is the supply of fluid to cylinders 76 in the structure shown in Fig. 4.

In certain cases the tumbling shaft does not extend in a straight line from one side of the locomotive to the other but is curved so as to pass freely under the belly of the boiler. Instead of providing a brake at each end of such a tumbling shaft, it is within the scope of my invention to employ such off-set of the tumbling shaft as a crank and to provide a locking means which will hold this crank at any desired adjustment. Such a construction is shown in Fig. 6. The tumbling shaft 100 is downwardly bowed between its extremities. Fixed to each end of the shaft 100 is a crank 101, such cranks being connected by hangers to the radius rods of the valve gear. The crank 101 at one end of the shaft has an upwardly disposed crank arm 102 integrally connected thereto. The outer end of arm 102 is connected by a reach rod 103 to the reversing gear which may be of the same type as that shown in Fig. 1.

In order to hold the shaft 100 at a fixed angular adjustment, I provide at a mid-point on the shaft, a fitting 104 which is formed with a socket to receive a ball 105 formed on the end of a stem 106. This stem at its opposite end is fixed to a piston or plunger 107 which operates in a hydraulic cylinder 108. The cylinder 108 is pivoted to a bracket 109 on the frame of the locomotive so that it may oscillate to accommodate itself to oscillations of the tumbling shaft 100. A by-pass 110 provides communication between opposite ends of the cylinder around the piston 107 so that as long as this by-pass is open the tumbling shaft 100 may be adjusted. However, when this by-pass is closed the piston 107 will be locked in its set position by reason of the bodies of incompressible fluid at opposite sides of said piston.

Normally, the by-pass 110 is closed by a valve 112 and a control for this valve is provided which is similar to the control for the brakes shown in Fig. 4. In other words, the valve 112 is connected to a plunger operating in a cylinder 76, the plunger being moved, in one direction by spring pressure and in the opposite direction by fluid pressure, such fluid pressure being applied to the piston to open the valve 112 whenever desired. The valve controlling the supply of fluid to the cylinder 76 is similar to that shown in Fig. 4 except that it is reversed. In other words, when the slide valve 79 is in the normal position shown in Fig. 6, the cylinder 76 is connected to atmosphere by way of pipe 78 and vent 81a and a spring corresponding to spring 77 in Fig. 4 holds valve 112 closed. When the valve 79 is moved toward the right by operating a handle, such as that shown at 63 in Fig. 4, the pipe 78 will be connected by way of pipe 80a to a source of fluid under pressure. This fluid acting on the piston in the cylinder 76 will open valve 112, thereby unlocking the hydraulic brake or locking means and the tumbling shaft may then be adjusted by operating the usual reversing gear connected to the reach rod 103.

Whenever the valve mechanism is subjected to sudden stresses these stresses must be absorbed in the main by the linkage connecting the valves to the tumbling shaft. The brake lining fabric 40 will absorb a small part of the shocks but in addition I prefer to provide resilient pads 115 of rubber or other suitable material which are inserted between the brackets 14 and the locomotive frame. Thus, the stresses imposed by valve impacts are cushioned in part by the pads 115 as well as the brake lining 40, thereby reducing the risk of breakage or other damage to valve linkage intervening between the tumbling shafts and the valves.

While I have described a preferred embodiment of my invention and certain modifications thereof it will be understood that these are to be taken as illustrative and not limitative and that I reserve the right to make various changes in form, construction and arrangement of parts without departing from the spirit and scope of my invention as set forth in the claims.

I claim:

1. The combination with a locomotive valve gear including a tumbling shaft, of a friction brake at each end of said shaft normally maintaining the shaft against angular movement on its axis, means for adjusting said shaft angularly, and a single controller for releasing both of the brakes at will to permit of such adjustment of said shaft.

2. The combination with a locomotive valve gear including a tumbling shaft, of a power reverse gear for adjusting the angular position of said shaft, control means for the power reverse gear including a hand wheel, a handle mounted on the wheel and movable to and from operative position, a lock on the tumbling shaft normally in locking position and maintaining the shaft fixed against angular movement, means actuated by movement of the handle to operative position to release the lock and permit angular adjustment of the shaft, and means for restoring the lock to locking position when said handle is moved out of operative position.

3. In combination, a locomotive valve gear comprising a pair of valves and a tumbling shaft and operating connections between opposite ends of said shaft and said valves respectively, means for adjusting the position of the shaft angularly, bearings for the shaft at each end thereof, the shaft being bowed between said bearings, a lock applied to the shaft at a median point between said bearings and normally preventing angular movement of the shaft, and means for releasing said lock at will to permit of angular adjustment of the shaft.

4. In combination, a locomotive valve gear comprising a pair of valves, a tumbling shaft, operating connections between opposite ends of said shaft and said valves respectively, means for adjusting the position of the shaft angularly, bearings for the shaft at each end thereof, the shaft being bowed between said bearings, a lock normally holding the shaft at adjusted angular position, said lock comprising a hydraulic cylinder, a piston fitted to slide therein and connected at its outer end to the shaft at a median point between said bearings, a by-pass from one end of the cylinder to the other, and a valve operable at will to control the by-pass.

5. In combination, a locomotive valve gear comprising a pair of valves and a tumbling shaft and operating connections between opposite ends of said shaft and said valves respectively, means for adjusting the position of the shaft angularly, the shaft having a crank portion substantially midway between its ends, a lock connected to the crank portion and normally preventing angular movement of the shaft, and means for releasing said lock at will to permit of angular adjustment of the shaft.

6. In combination, a locomotive valve gear comprising a pair of valves and a tumbling shaft and operating connections between opposite ends of said shaft and said valves respectively, means for adjusting the position of the shaft angularly, the shaft having a crank portion substantially midway between its ends, a lock normally preventing angular movement of the shaft, said lock comprising a hydraulic cylinder, a piston fitted to slide therein and connected to said crank portion, a by-pass from one end of the cylinder to the other, and a valve operable at will to control the by-pass.

7. The combination with a locomotive valve gear including a tumbling shaft, of means for adjusting the position of the shaft angularly, means normally locking the shaft against angular adjustment, and means for releasing the locking means at will to permit of angular adjustment of the shaft, said locking means being applied to the shaft symmetrically with respect to the opposite ends of the shaft.

8. In combination a locomotive valve gear comprising a pair of valves and a tumbling shaft and operating connections between opposite ends of the shaft and said valves respectively, means for adjusting the position of the shaft angularly, means normally locking the shaft against angular adjustment, and means for releasing the locking means at will to permit of angular adjustment of the shaft, said locking means being applied to the shaft symmetrically with respect to said operating connections.

9. The combination with a locomotive valve gear including a tumbling shaft adjustable angularly on its axis, of means normally locking the shaft against angular adjustment, means for releasing the locking means, said locking and releasing means being applied symmetrically with respect to the opposite ends of the shaft, and a unitary control means for operating said releasing means and angularly adjusting said shaft at will.

10. The combination with a locomotive valve gear comprising a pair of valves, a tumbling shaft and operating connections between opposite ends of the shaft and said valves respectively, of means normally locking the shaft against angular adjustment on its axis, releasing means for said locking means, said locking means and releasing means being disposed symmetrically with respect to said operating connections, and a unitary control for operating said releasing means and adjusting said shaft angularly at will.

11. The combination with a locomotive valve gear comprising a pair of valves, a tumbling shaft, a pair of crank arms fixed to the shaft and disposed respectively at opposite ends thereof, and operating connections between the crank arms and the valves respectively, of means for adjusting the position of the shaft angularly on its axis, a lock adjacent each crank arm normally locking the shaft against angular adjustment, a releasing device for each lock, and a single controller for both of the releasing devices.

12. The combination with a locomotive valve gear including a tumbling shaft and bearings therefor, of a power reverse gear for adjusting the angular position of said shaft, a remote controller for the power reverse gear, a lock at each end of the shaft normally applied and locking said shaft against angular movement in its bearings, means operatively associated with the controller for simultaneously releasing both of the locks to permit of angular adjustment of said shaft, and means for restoring the locks to normal locking position after said shaft has been angularly adjusted.

13. The combination with a locomotive valve gear including a tumbling shaft, of a power reverse gear for adjusting the angular position of said shaft, control means for the power reverse gear including a hand wheel, a handle mounted on the wheel and movable to and from operative position, means normally locking and maintaining the shaft fixed against angular movement, means actuated by movement of the handle to operative position to release the locking means and permit angular adjustment of the shaft, and means for restoring the locking means to locking position when said handle is moved out of said operative position.

WILLIAM BELL WAIT.